United States Patent
Choong et al.

(10) Patent No.: US 9,645,028 B2
(45) Date of Patent: May 9, 2017

(54) RESISTIVE PRESSURE SENSOR INCLUDING PIEZO-RESISTIVE ELECTRODE

(71) Applicant: SAMSUNG ELECTRONICS CO., LTD., Suwon-si (KR)

(72) Inventors: Chwee Lin Choong, Suwon-si (KR); Jongjin Park, Hwaseong-si (KR); Jihyun Bae, Seoul (KR); Byoungsun Lee, Seoul (KR); Jungkyun Im, Asan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 14/478,755

(22) Filed: Sep. 5, 2014

(65) Prior Publication Data

US 2015/0059486 A1 Mar. 5, 2015

(30) Foreign Application Priority Data

Sep. 5, 2013 (KR) .................. 10-2013-0106824

(51) Int. Cl.
*G01L 9/00* (2006.01)
*G01L 1/22* (2006.01)

(52) U.S. Cl.
CPC .......... *G01L 9/0052* (2013.01); *G01L 1/2206* (2013.01); *G01L 1/2293* (2013.01); *G01L 2009/0069* (2013.01)

(58) Field of Classification Search
CPC .................. G01L 9/0047; G01L 9/0083
See application file for complete search history.

(56) References Cited

U.S. PATENT DOCUMENTS

| | | | |
|---|---|---|---|
| 6,555,024 B2 | 4/2003 | Ueda et al. | |
| 7,112,755 B2 | 9/2006 | Kitano et al. | |
| 7,528,337 B2 | 5/2009 | Tanabe et al. | |
| 7,645,398 B2 | 1/2010 | Kim et al. | |
| 8,371,174 B2 | 2/2013 | Chen et al. | |
| 2010/0090299 A1* | 4/2010 | Chang | G01L 1/205 257/419 |
| 2011/0048139 A1* | 3/2011 | Chen | G01L 9/0052 73/727 |

(Continued)

FOREIGN PATENT DOCUMENTS

JP 2009-222511 A 10/2009

OTHER PUBLICATIONS

Schwartz, et al.; "Flexible Polymer Transistors with High Pressure Sensitivity for Application in Electronic Skin and Health Monitoring", Nature Communications, May 14, 2013, 8 pages total.

(Continued)

*Primary Examiner* — Robert Huber
*Assistant Examiner* — Herbert K Roberts
(74) *Attorney, Agent, or Firm* — Sughrue Mion, PLLC (57) ABSTRACT

Provided is a pressure sensor including an elastic thin film including a first surface and a second surface that face each other, the elastic thin film including an elastomer material, a plurality of protruding deformable structures patterned on the first surface; a piezoresistive electrode formed along surfaces of the plurality of protruding deformable structures; and a counter electrode disposed to face the piezoresistive electrode.

20 Claims, 10 Drawing Sheets

(56) References Cited

U.S. PATENT DOCUMENTS

| 2011/0062824 A1* | 3/2011 | Wada | B06B 1/0622 |
| | | | 310/334 |
| 2011/0203390 A1* | 8/2011 | Tao | A43B 3/0005 |
| | | | 73/862.046 |
| 2013/0047747 A1 | 2/2013 | Joung | |

OTHER PUBLICATIONS

Zhang, et al.; "Frequency-Multiplication High-Output Triboelectric Nanogenerator for Sustainably Powering Biomedical Microsystems", Nano Letters, Feb. 5, 2013, 5 pages total.

Mannsfeld, et al.; "Highly Sensitive Flexible Pressure Sensors with Micro-structured Rubber Dielectric Layers", Nature Materials 9, Oct. 2010, 4 pages total.

Xu, et al.; "Integrated Multilayer Nanogenerator Fabricated Using Paired Nanotip-to-Nanowire Brushes", Nano Letters, Oct. 2008, vol. 8, No. 11, 6 pages total.

Fan, et al.; "Transparent Triboelectric Nanogenerators and Self-Powered Pressure Sensors Based on Micropatterned Plastic Films", Nano Letters, Apr. 2012, 6 pages total.

\* cited by examiner

RESISTIVE PRESSURE SENSOR INCLUDING PIEZO-RESISTIVE ELECTRODE

CROSS-REFERENCE TO RELATED APPLICATION

This application claims the benefit of Korean Patent Application No. 10-2013-0106824, filed on Sep. 5, 2013, in the Korean Intellectual Property Office, the disclosure of which is incorporated herein in its entirety by reference.

BACKGROUND

1. Field

The exemplary embodiments relate to resistive pressure sensors including a piezo-resistive electrode.

2. Description of the Related Art

Recently, much attention has been paid to a technology of high-sensitive pressure sensors having electronic skin and capable of being attached to objects that are soft and that have a curvature, e.g., a human body, to perform pulse monitoring.

These pressure sensors are required to have enough sensitivity to sense a weak stimulus such as the landing of a fly and to be conformably attached to a human body that is soft and has a curvature.

Pressure sensors may be classified into a Strain gauge pressure sensor, a piezoelectric pressure sensor, a piezo-resistive pressure sensor, an electrostatic capacitive pressure sensor, and an optical pressure sensor according to driving methods.

A pressure sensor including a rubber material containing conductive particles has been developed as an example of the piezo-resistive pressure sensor. The pressure sensor is configured to sense a change in a resistance caused by a change in the distribution of conductive particles of a contacted portion thereof when pressure is applied to the pressure sensor. However, the pressure sensor has a very low sensitivity.

SUMMARY

Exemplary embodiments may provide resistive pressure sensors having high sensitivity.

Additional aspects will be set forth in part in the description which follows and, in part, will be apparent from the description, or may be learned by practice of the presented exemplary embodiments.

According to an aspect of an exemplary embodiment, there is provided a pressure sensor including an elastic thin film including a first surface and a second surface that face each other, the elastic film including an elastomer material, a plurality of protruding deformable structures patterned on the first surface; a piezoresistive electrode formed along surfaces of the plurality of protruding deformable structures; and a counter electrode disposed to face the piezoresistive electrode.

The elastic thin film may include at least one of thermoplastic rubber, silicone rubber, fluoro silicone rubber, vinyl methyl silicone rubber, styrene-butadiene rubber, styrene-ethylene-butylene-strylene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, polyurethane rubber, and polydimethylsiloxane (PDMS).

The first piezoresistive electrode may include a mixture of a flexible or elastic polymer material and a conductive material.

The conductive material may include at least one of conductive polymer, metal nanowire, metal nanoparticles, carbon nanotubes, and graphene.

The polymer material may include at least one of polyester, polyvinyl alcohol, polyvinyl acetate, thermoplastic rubber, and silicone rubber.

The cross-sectional areas of the plurality of protruding deformable structures may be tapered as the plurality of protruding deformable structures extend towards the counter electrode.

The piezoresistive electrode may be thinnest at uppermost portions of the plurality of protruding deformable structures, the uppermost portions being portions which are nearest to the counter electrode, and may become thicker from the upper most portions to bottom portions of the plurality of protruding deformable structures.

The piezoresistive electrode may be conformably formed along shapes of the plurality of protruding deformable structures.

The plurality of protruding deformable structures may include at least one of a cylindrical shape, a polygonal pillar shape, a cone shape, a polypyramid shape, a truncated cone shape, and a truncated polypyramid shape.

The counter electrode may include a metal.

The counter electrode may include an elastic conductive material.

The pressure sensor may further include a plurality of other protruding deformable structures patterned on the second surface of the elastic thin film.

The pressure sensor may further include another piezoresistive electrode formed on surfaces of the other protruding deformable structures; and another counter electrode disposed to face the other piezoresistive electrode.

The piezoresistive electrode may be continuously formed along the surfaces of the plurality of protruding deformable structures.

The piezoresistive electrode may include a plurality of sub piezoresistive electrodes discontinuously formed along the surfaces of the plurality of protruding deformable structures, the sub piezoresistive electrodes being spaced apart from one another.

The counter electrode may include a plurality of sub counter electrodes corresponding to the plurality of sub piezoresistive electrodes.

Otherwise, the first counter electrode may include a flat plate type electrode disposed to face the plurality of sub piezoresistive electrodes.

The counter electrode and the piezoresistive electrode may be spaced apart from each other. When pressure is applied to the counter electrode, the counter electrode may contact the piezoresistive electrode to thereby deform the piezoresistive electrode.

An equivalent resistance of the pressure sensor may include a resistance of the counter electrode; a resistance of the piezoresistive electrode; and a resistance at an interface between the counter electrode and the piezoresistive electrode. The resistance of the counter electrode may have a lower resistance than the resistance of the piezoresistive electrode, and the resistance of the counter electrode is also lower than the resistance at the interface between the counter electrode and the piezoresistive electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The exemplary embodiments may be embodied in many different forms and various exemplary embodiments. Thus, exemplary embodiments will be illustrated in the drawings and described in the present disclosure in detail. The effects and features of the exemplary embodiments and methods of accomplishing the exemplary embodiments will be apparent from these exemplary embodiments set forth herein, together with the accompanying drawings. However, the exemplary embodiments are not limited to these exemplary embodiments and may be embodied in various forms.

Hereinafter, exemplary embodiments will be described in detail with reference to the accompanying drawings. When the exemplary embodiments are described with reference to the drawings, the same or corresponding constitutional elements will be assigned the same reference numerals and will thus not be redundantly described herein.

As used herein, the term "and/or" includes any and all combinations of one or more of the associated listed items.

In the exemplary embodiments set forth herein, the terms 'first', 'second', etc., are only used to distinguish one element, component, region, layer, or section from another element, component, region, layer, or section.

As used herein, the singular forms 'a', 'an', and 'the' are intended to include the plural forms as well, unless the context clearly indicates otherwise.

As used herein, the terms 'comprise' and/or 'comprising' specify the presence of stated features, integers, steps, operations, elements, and/or components but do not preclude the presence or addition of one or more other features, integers, steps, operations, elements, components, and/or groups thereof.

As used herein, when an element or layer is referred to as being 'on' another element or layer, the element or layer can be directly on another element or layer or intervening elements or layers.

In the drawings, the lengths and sizes of layers and regions may be exaggerated for clarity. For example, the sizes and thicknesses of layers and regions are arbitrarily illustrated in the drawings for convenience of explanation and thus the exemplary embodiments are not limited thereto.

When an exemplary embodiment may be accomplished in a different way, a particular process may be performed in an order that is different from that described in the present disclosure. For example, two processes described continuously may be actually simultaneously performed or may be performed in a reverse order.

Figure 1:
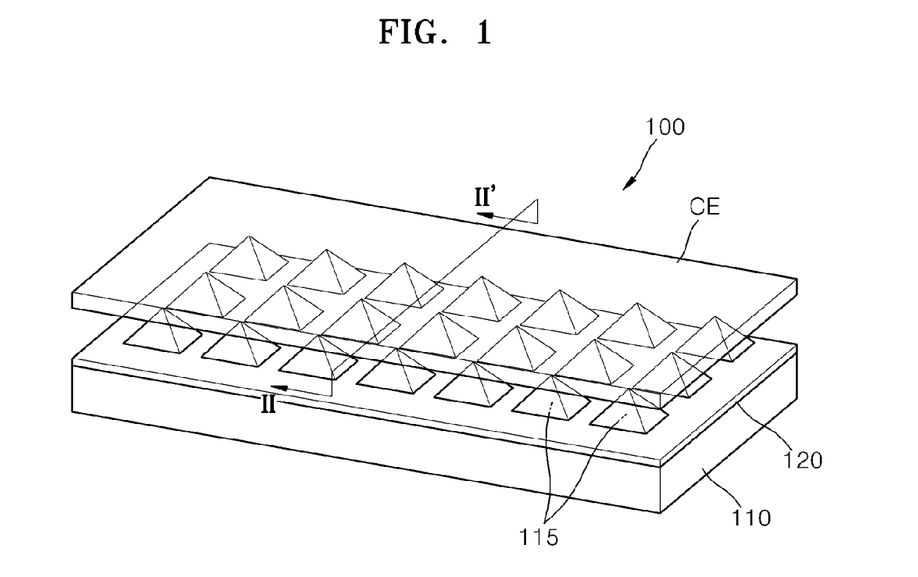
FIG. 1 is a schematic perspective view of a pressure sensor according to an exemplary embodiment.
Figure 2A:
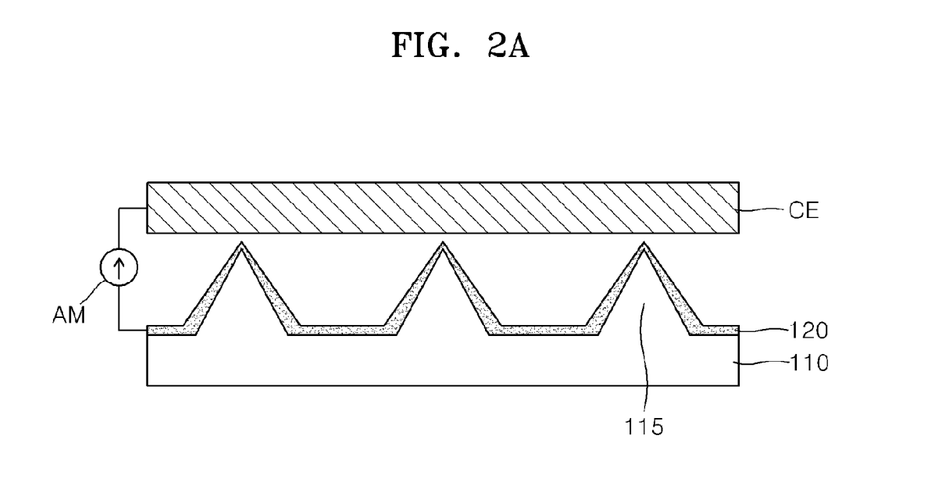
FIGS. 2A to 2C are cross-sectional views of FIG. 1 taken along line II-II', which exemplarily illustrate a change in the shape of a piezoresistive electrode when pressure is applied thereto.
Figure 2B:
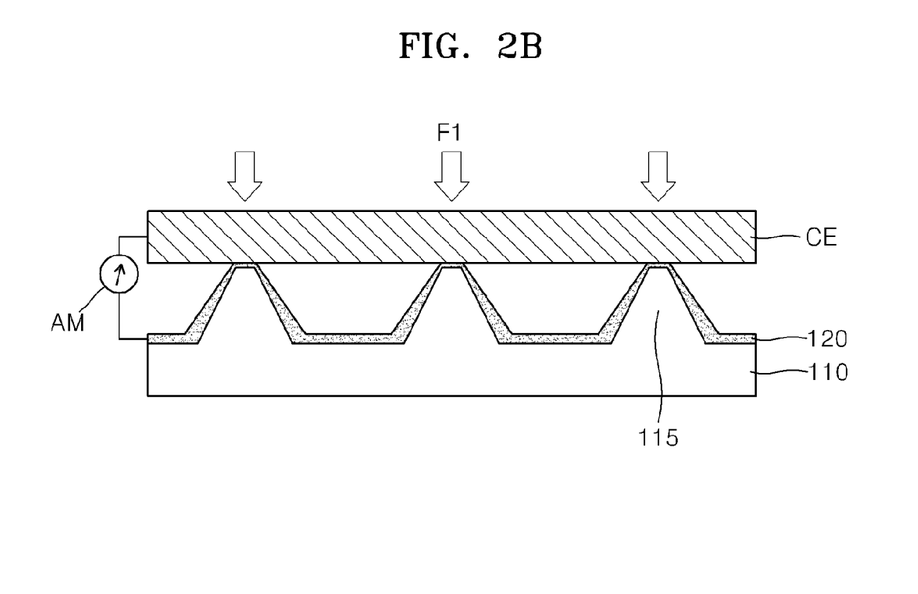
Figure 2C:
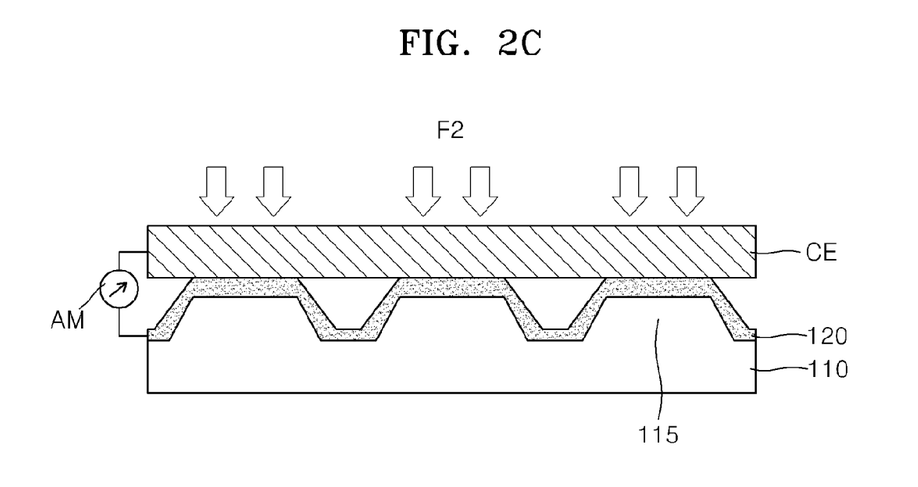

FIG. 1 is a schematic perspective view of a pressure sensor 100 according to an exemplary embodiment. FIGS. 2A to 2C are cross-sectional views of FIG. 1 taken along line II-II', which exemplarily illustrate a change in the shape of a piezoresistive electrode when pressure is applied thereto.

The pressure sensor 100 includes an elastic thin film 110 in which a plurality of protruding deformable structures 115 are patterned, a piezoresistive electrode 120 formed on surfaces of the plurality of deformable structures 115, and a counter electrode CE disposed to face the piezoresistive electrode 120.

The elastic thin film 110 may be formed of an elastomer material that is elastic and flexible, e.g., thermoplastic rubber, silicone rubber, fluoro silicone rubber, vinyl methyl silicone rubber, styrene-butadiene rubber, styrene-ethylene-butylene-strylene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, polyurethane rubber, or polydimethylsiloxane (PDMS). The plurality of deformable structures 115, the shapes of which are changed when pressure is applied thereto and restored to the original states when the applied pressure is removed, are formed on a surface of the elastic thin film 110. Also, the plurality of deformable structures 115 may be set such that their shapes are changed to a great degree even when low pressure is applied thereto. For example, the plurality of deformable structures 115 may be formed in a truncated cone shape, a truncated polypyramid shape, a cone shape, or a polypyramid shape so that the cross-sectional areas thereof may be tapered as the plurality of deformable structures 115 come closer to the counter electrode CE. However, the exemplary embodiments are not limited thereto, and the plurality of deformable structures 115 may have a cylindrical shape, a polygonal shape, etc. The plurality of deformable structures 115 may be arranged in a two-dimensional (2D) array as illustrated in FIG. 1 but is not limited thereto.

The piezoresistive electrode 120 formed on surfaces of the plurality of deformable structures 115 may be formed by mixing a soft or elastic polymer material and a conductive material together. The conductive material may include a conductive polymer, metal nanowire, metal nanoparticles, carbon nanotubes, or graphene. The polymer material may include polyester, polyvinyl alcohol, polyvinyl acetate, thermoplastic rubber, or silicone rubber.

The piezoresistive electrode 120 may be conformably formed along the shapes of the plurality of deformable structures 115. To this end, the piezoresistive electrode 120 may be formed to an appropriate thickness. The piezoresistive electrode 120 may be thinnest at uppermost portions of the plurality of deformable structures 115 and become thicker from top to bottom.

The counter electrode CE is configured to deliver externally applied pressure to the plurality of deformable structures 115 and to measure a change in electric current between the plurality of deformable structures 115 and the piezoresistive electrode 120 when the shapes of the plurality of deformable structures 115 are changed due to the pressure applied thereto. The counter electrode CE may be formed of a high-conductive metal but is not limited thereto and may be formed of a flexible conductive material.

As illustrated in FIG. 2A, the counter electrode CE and the piezoresistive electrode 120 are separated from each other in an initial state in which no pressure is applied to the counter electrode CE. Thus, a conduction path is not formed between the counter electrode CE and the piezoresistive electrode 120 and the flow of current is thus not sensed by an amperemeter AM. However, the initial state is only an example and a state in which a predetermined initial current is formed may be set as the initial state. For example, a state in which the counter electrode CE applies a predetermined low pressure to the piezoresistive electrode 120 and a low initial current is formed while the shapes of the piezoresistive electrode 120 are not substantially changed and the counter electrode CE and the piezoresistive electrode 120 contact each other may be set as the initial state.

As illustrated in FIG. 2B, when pressure is applied to the counter electrode CE by a predetermined force F1, the shapes of the plurality of deformable structures 115 are changed. Also, a conduction path is formed from the counter electrode CE to the piezoresistive electrode 120 and current is thus sensed by the amperemeter AM.

As illustrated in FIG. 2C, when pressure is applied to the counter electrode CE by a force F2 that is stronger than the force F1, the shapes of the plurality of deformable structures 115 are changed to a greater degree than when the force F1 is applied. As a result, a greater amount of current is sensed flowing through the amperemeter AM than when the force F1 is applied.

The change in the current is caused by a change in an equivalent resistance of the counter electrode CE and the piezoresistive electrode 120 when the pressure is applied, as will be described in greater detail below.

Figure 3:
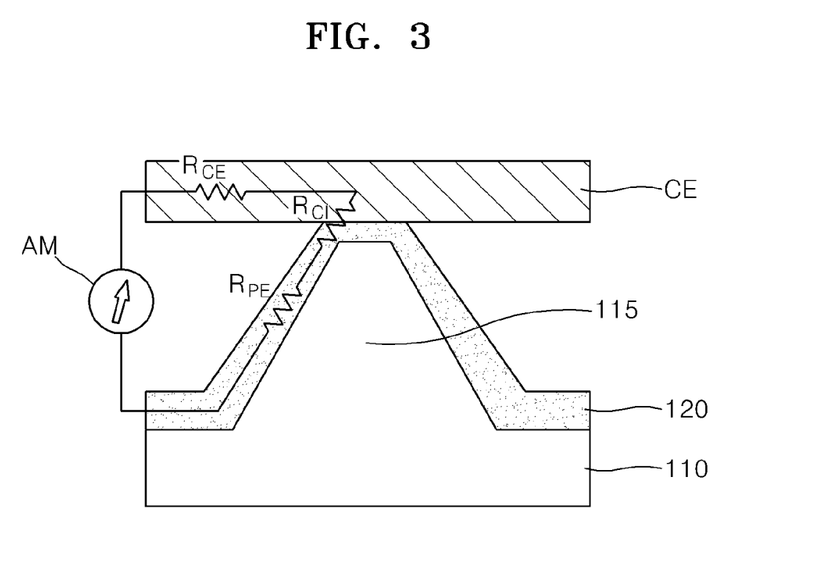
FIG. 3 is a schematic equivalent circuit diagram illustrating a working principle of the pressure sensor of FIG. 1.

FIG. 3 is a schematic equivalent circuit diagram illustrating a working principle of the pressure sensor 100 of FIG. 1.

An equivalent resistance R of the pressure sensor 100 is as follows:

$$R = R_{CE} + R_{CI} + R_{PE},$$

wherein '$R_{CE}$', '$R_{CI}$', and '$R_{PE}$' denote a resistance of the counter electrode CE, a resistance at an interface between the counter electrode CE and the piezoresistive electrode 120, and a resistance of the piezoresistive electrode 120, respectively.

The resistance of the counter electrode CE is designed to have a very low value compared to the other resistors. Approximately, $R \approx R_{CI} + R_{PE}$ and may be expressed by an equation below.

$$R = \frac{\rho_{CI} L_{CI}}{A_{CI}} + \frac{\rho_{PE} L_{PE}}{D_{PE} W_{PE}},$$

wherein '$\rho$' denotes a resistivity, and 'A', 'L', and 'W' denote the cross-section area, length, and width of a path through which current flows, respectively.

The values A, L, and W may vary according to a change in the shape of the piezoresistive electrode 120. That is, a change in a resistance caused by a change in the shape of the piezoresistive electrode 120 may be expressed by an equation below.

$$\Delta R = \rho_{CI} L_{CI} \left( \frac{1}{A_{CI}} - \frac{1}{A_{CI_0}} \right) + \rho_{PE} L_{PE} \left( \frac{1}{D_{PE} W_{PE}} - \frac{1}{D_{PE_0} W_{PE_0}} \right)$$

The degree of pressure applied to the counter electrode CE may be analyzed based on the change in the resistance $\Delta R$.

The sensitivity of the pressure sensor 100 configured to measure pressure based on the above principle is determined by the shapes of the plurality of deformable structures 115.

Figure 4A:
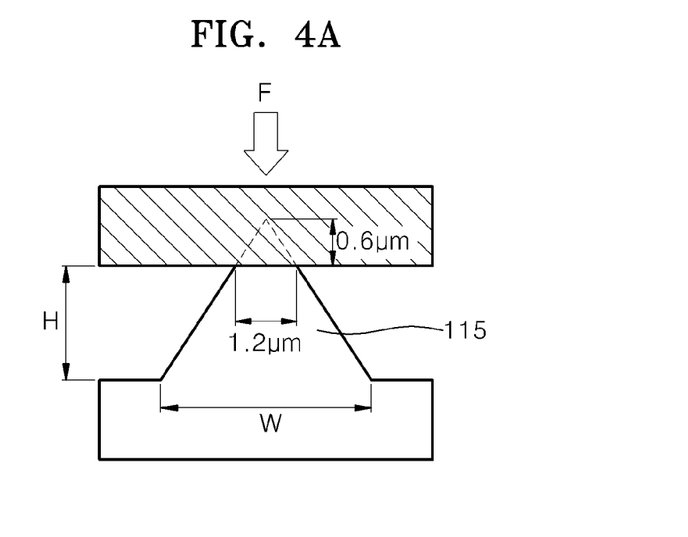
FIGS. 4A and 4B illustrate a pyramid-shaped microstructure and a cylindrical microstructure to explain a shape factor related to the sensitivity of a pressure sensor.
Figure 4B:
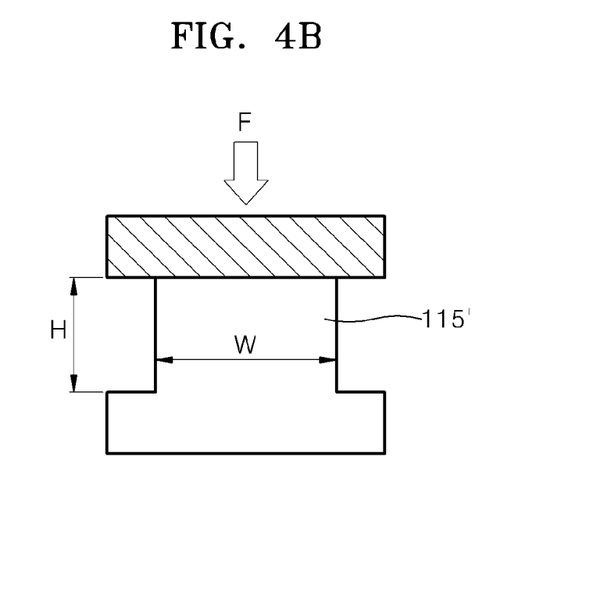

FIGS. 4A and 4B illustrate a deformable structure 115 having a pyramid shape and a deformable structure 115' having a cylindrical shape to explain a shape factor related to the sensitivity of pressure sensor.

The shape factor may be defined as follows:

$$\text{Shape factor}(SF) = \frac{\text{Area of one loaded surface}}{\text{Total area of unlocked surfaces free to expand}}$$

That is, the shape factor refers to a ratio of the area of a loaded surface to the total area of unloaded surfaces that are free to expand.

The shape factor of the deformable structure 115 having the pyramid shape illustrated in FIG. 4A and the shape factor of the deformable structure 115' having the cylindrical shape illustrated in FIG. 4B may be calculated as described below.

In FIG. 4A, the shape factor may be calculated as follows:

Loaded surface area=(½×1.2×0.6)×4=1.44 μm²

Area free to expand=(½×(1.2+$W$)×$H$)×4=13.6 μm²

In order to calculate the loaded surface area, it is assumed that a peak portion of the pyramid shape is deformed to a degree as illustrated in FIG. 4A by an initial predetermined low force F, the pyramid shape is a quadrangular pyramid, and 'W' and 'H' are 8 μm and 3.4 μm, respectively.

Here, the shape factor is calculated to be (1.44/13.6)=0.11.

In FIG. 4B, the shape factor may be calculated as follows:

Loaded surface area=$\pi \times (W/2)^2$

Area free to expand=$\pi \times W \times H$

Here, the shape factor is calculated to be (W/4H)=0.59.

The shape factor of the deformable structure 115 having the pyramid shape is less than that of the deformable structure 115' having the cylindrical shape. This indicates that a large area of the deformable structure 115 having the pyramid shape may be deformed even when pressure is applied to a small area thereof. The less the shape factor, the higher the sensitivity that the pressure sensor may have.

A pressure sensor according to an exemplary embodiment employs deformable structures having a low shape factor and a piezoresistive electrode on the deformable structures, and is thus capable of exhibiting a large change in a resistance even when low pressure is applied thereto. Thus, it is expected that the sensitivity of the pressure sensor capable of measuring pressure will be high. The inventor of the exemplary embodiments compared the performance of the pressure sensor 100 including the pyramid-shaped deformable structures of FIG. 1 with the performance of a pressure sensor including a film type piezoresistive electrode that does not include deformable structures, and determined that the degree of a change in current according to applied pressure is greater in the case of the pressure sensor 100 according to an exemplary embodiment.

Figure 5:
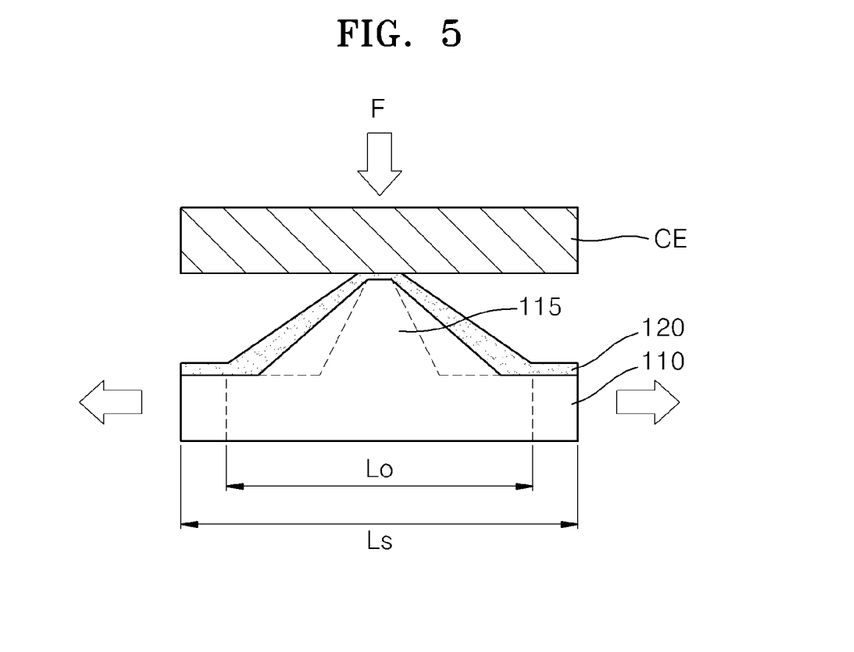
FIG. 5 is a diagram illustrating a method of measuring pressure by using a pressure sensor according to an exemplary embodiment, in which pressure is applied to a piezoresistive electrode while stretching the piezoresistive electrode in a direction perpendicular to a direction in which the pressure is applied.

FIG. 5 is a diagram illustrating a method of measuring pressure by using a pressure sensor according to an exemplary embodiment, in which pressure is applied to a piezoresistive electrode 120 while stretching the piezoresistive electrode 120 in a direction perpendicular to a direction in which the pressure is applied.

Tensile stress may be applied to the piezoresistive electrode 120 so as to increase the sensitivity of the pressure sensor. That is, the applied pressure may be measured by applying the tensile stress to the piezoresistive electrode 120 in the direction perpendicular to the direction in which the pressure is to be applied, applying the pressure to the piezoresistive electrode 120 while the piezoresistive electrode 120 is stretched, and measuring current between a counter electrode CE and the piezoresistive electrode 120. An elastic thin film 110 is stretched from a length Lo to a length Ls according to the applied tensile stress. In the pressure sensor according to an exemplary embodiment, the elastic thin film 110 which is stretchable is employed and the piezoresistive electrode 120 is formed on the elastic thin film 110 by using a polymer material. Thus, as the elastic thin film 100 is stretched, the piezoresistive electrode 120 may be also stretched. The sensitivity of the pressure sensor may be increased by appropriately setting the length Lo of the elastic thin film 110 before the tensile stress is applied and the length Ls of the elastic thin film 110 after the tensile stress is applied. The inventor of the exemplary embodiments analyzed the performance of the pressure sensor while changing the degree of stretching, and determined that the sensitivity of the pressure sensor in a predetermined pressure section may be increased by applying an appropriate tensile stress. The tensile stress may be determined in consideration of the range of pressures to be measured. For example, appropriate tensile stress may be applied to the elastic thin film 110 so as to increase the sensitivity of the pressure sensor when pressure in the predetermined pressure section is measured, and tensile stress may not be applied when pressure in another range of pressures is measured.

Figure 6:
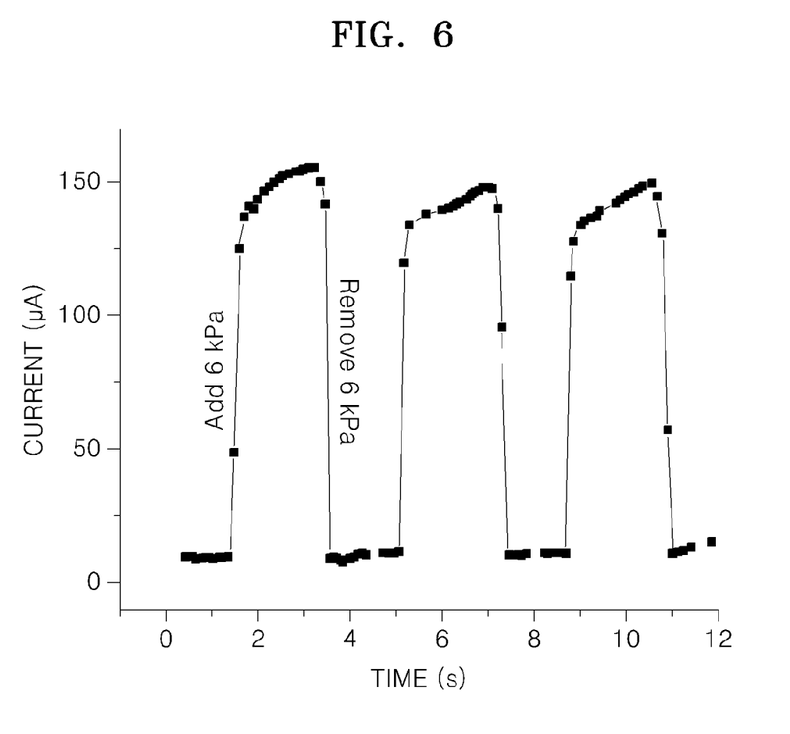
FIG. 6 is a graph showing reproducibility of repeated pressure measurement using a pressure sensor according to an exemplary embodiment.

FIG. 6 is a graph showing reproducibility of repeated pressure measurement using a pressure sensor according to an exemplary embodiment.

Referring to FIG. 6, it is shown that a change in current was substantially the same when pressure was repeatedly measured and reproducibility was high.

Figure 7:
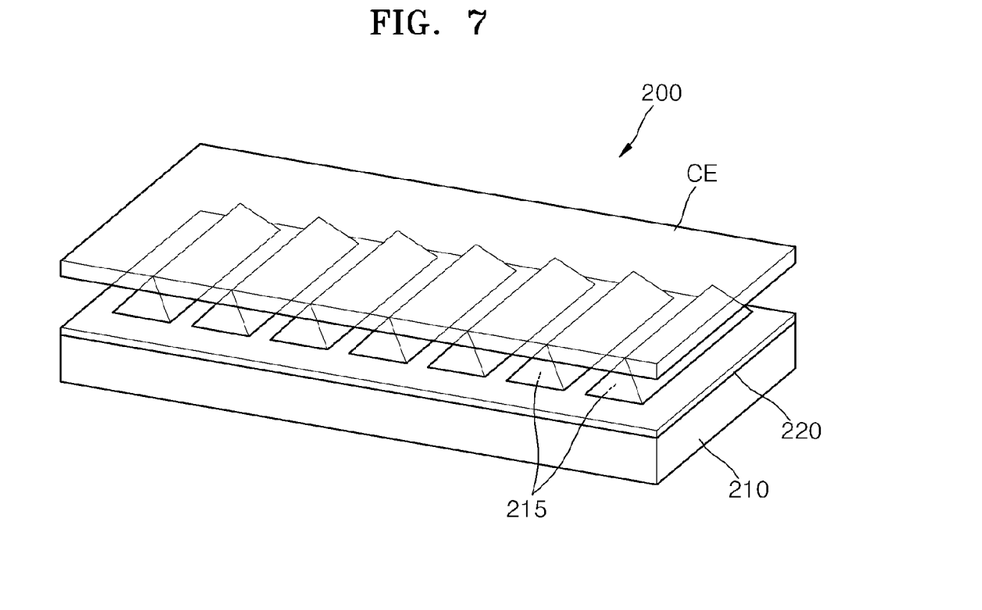
FIG. 7 is a schematic sectional view of a pressure sensor according to another exemplary embodiment.

FIG. 7 is a schematic perspective view of a pressure sensor 200 according to another exemplary embodiment.

The pressure sensor 200 includes an elastic thin film 210 having a plurality of deformable structures 215 on a surface thereof, a piezoresistive electrode 220 formed on the elastic thin film 210 and along surfaces of the plurality of deformable structures 215, and a counter electrode CE disposed to face the piezoresistive electrode 220.

The pressure sensor 200 according to the current exemplary embodiment is different from the pressure sensor 100 of FIG. 1 in that the plurality of deformable structures 215 are one-dimensionally arranged in a direction perpendicular to a lengthwise direction.

Figure 8:
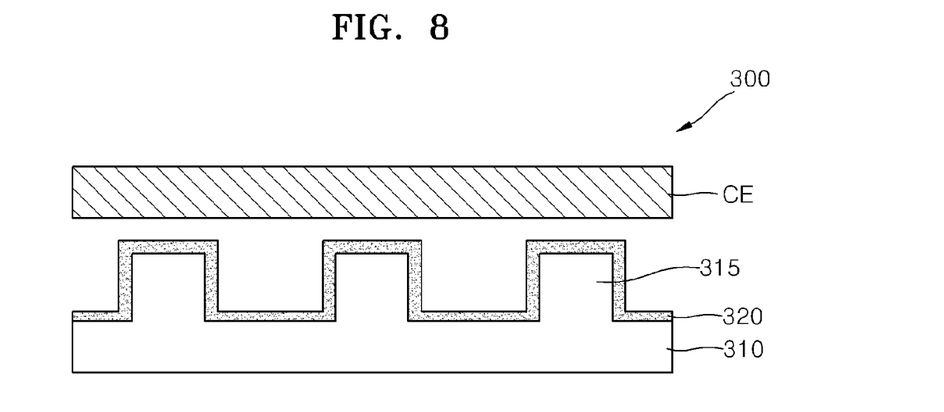
FIG. 8 is a schematic sectional view of a pressure sensor according to another exemplary embodiment.

FIG. 8 is a schematic sectional view of a pressure sensor 300 according to another exemplary embodiment.

The pressure sensor 300 includes an elastic thin film 310 in which a plurality of deformable structures 315 are patterned on a surface of the elastic thin film 310, a piezoresistive electrode 320 formed on the elastic thin film 310 and along surfaces of the plurality of deformable structures 315, and a counter electrode CE disposed to face the piezoresistive electrode 320.

The pressure sensor 300 according to the current exemplary embodiment is different from the pressure sensor 100 of FIG. 1 in which the plurality of deformable structures 315 are formed in a cylindrical shape. The plurality of deformable structures 315 may have a cylindrical shape or a polygonal pillar shape, and may be one-dimensionally or two-dimensionally arranged on a surface of the elastic thin film 320.

Figure 9:
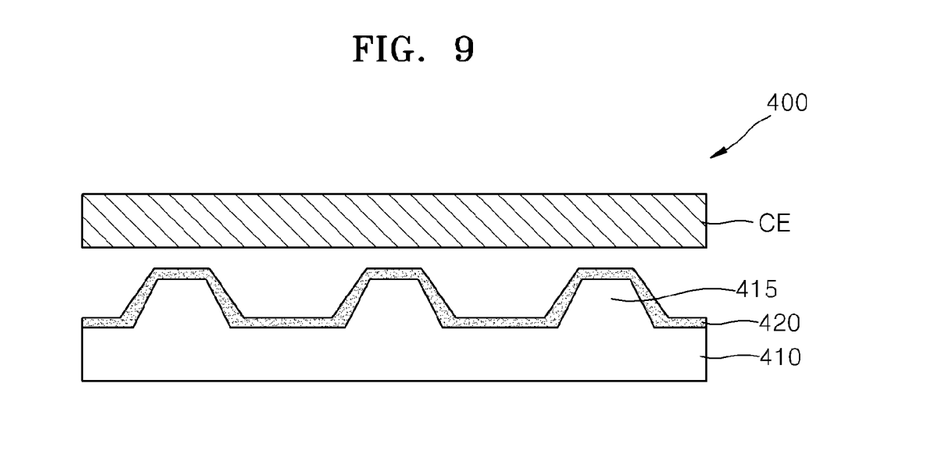
FIG. 9 is a schematic sectional view of a pressure sensor according to another exemplary embodiment.

FIG. 9 is a schematic sectional view of a pressure sensor 400 according to another exemplary embodiment.

The pressure sensor 400 includes an elastic thin film 410 in which a plurality of deformable structures 415 are patterned on a surface of the elastic thin film 410, a piezoresistive electrode 420 formed on the elastic thin film 410 and along surfaces of the plurality of deformable structures 415, and a counter electrode CE disposed to face the piezoresistive electrode 420.

The pressure sensor 400 according to the current exemplary embodiment is different from the pressure sensor 100 of FIG. 1 in that the plurality of deformable structures 415 have a truncated pyramid shape. The plurality of deformable structures 415 may have a truncated cone shape or a truncated polypyramid shape and be one-dimensionally or two-dimensionally arranged on a surface of the elastic thin film 410.

Figure 10:
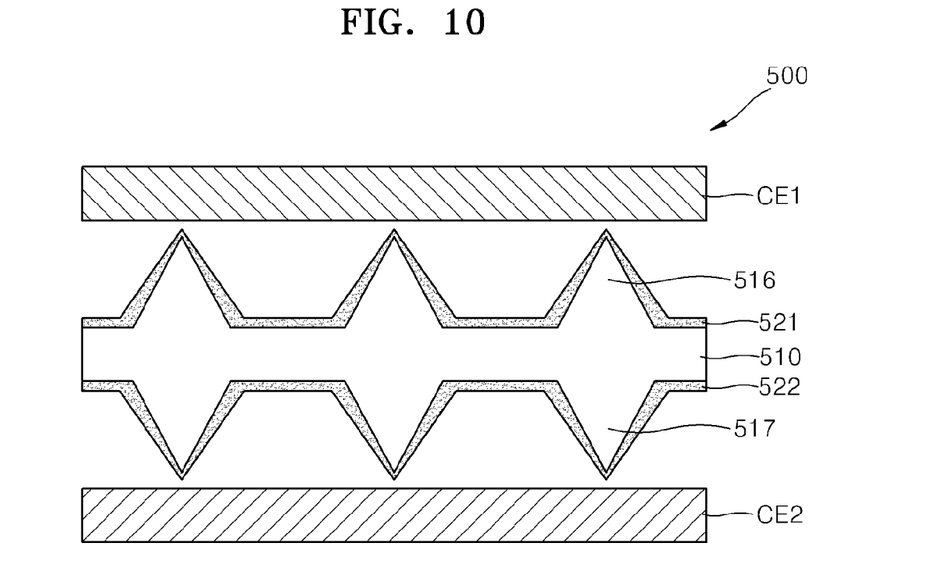
FIG. 10 is a schematic sectional view of a pressure sensor according to another exemplary embodiment.

FIG. 10 is a schematic sectional view of a pressure sensor 500 according to another exemplary embodiment.

The pressure sensor 500 includes an elastic thin film 510 in which a plurality of first deformable structures 516 and a plurality of second deformable structures 517 are patterned on both surfaces of the elastic thin film 510, respectively, and a first piezoresistive electrode 521 and a second piezoresistive electrode 522 formed on both surfaces of the elastic thin film 510 and along surfaces of the plurality of first and second deformable structure 516 and 517.

A first counter electrode CE1 is disposed to face the first piezoresistive electrode 521, and a second counter electrode CE2 is disposed to face the second piezoresistive electrode 522.

The structure of the pressure sensor 500 described above enables the pressure sensor 500 to have an increased sensitivity of pressure measurement. For example, when pressure is applied to the first counter electrode CE1, not only the shapes of the plurality of first deformable structure 516 but also the shapes of the plurality of second deformable structures 517 are changed. Thus, a change in current may be measured between the first counter electrode CE and the first piezoresistive electrode 521 and between the second counter electrode CE2 and the second piezoresistive electrode 522.

Figure 11:
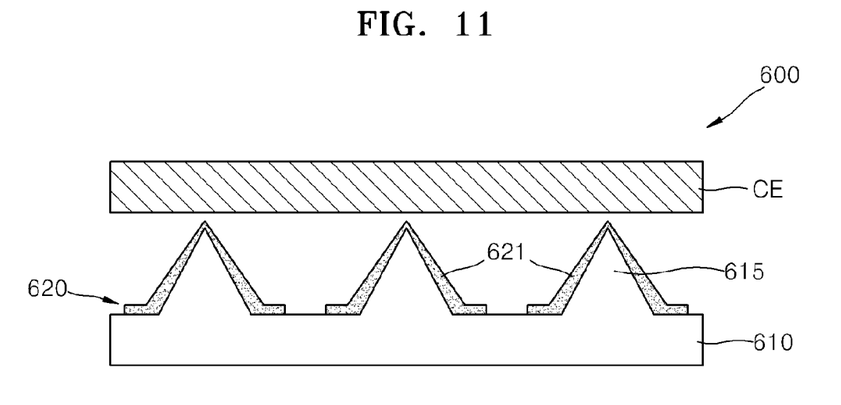
FIG. 11 is a schematic sectional view of a pressure sensor according to another exemplary embodiment.

FIG. 11 is a schematic sectional view of a pressure sensor 600 according to another exemplary embodiment.

The pressure sensor 600 includes an elastic thin film 610 in which a plurality of deformable structures 615 are patterned on a surface of the elastic thin film 610, a piezoresistive electrode 620 formed on the elastic thin film 610 and along surfaces of the plurality of deformable structures 615, and a counter electrode CE disposed to face the piezoresistive electrode 620.

The piezoresistive electrode 620 according to the current exemplary embodiment includes a plurality of sub piezoresistive electrodes 621 that are discontinuously formed on the surfaces of the plurality of respective deformable structures 615 such that the sub piezoresistive electrodes 621 are not connected to one another, compared to the piezoresistive electrode that is continuously formed on the surfaces of the plurality of deformable structures in the previously described exemplary embodiments.

The counter electrode CE may be prepared in the form of a flat plate to face the plurality of sub piezoresistive electrodes 621.

The structure of the counter electrode CE enables the pressure sensor 600 to sense not only the degree of pressure applied to the counter electrode CE but also the location on the counter electrode CE to which the pressure is applied. For example, when a local distribution of pressure is applied to the counter electrode CE, the location on the counter electrode CE to which the pressure is applied and the degree of the applied pressure may be sensed together by measuring a change in current at only a sub piezoresistive electrode 621 on the location corresponding to the local distribution of pressure applied. When a predetermined distribution of pressure, e.g., different degrees of pressure, is applied to different locations on the counter electrode CE, the predetermined distribution of pressure may be measured by measuring different changes in current at sub piezoresistive electrodes 621 corresponding to the different locations.

Figure 12:
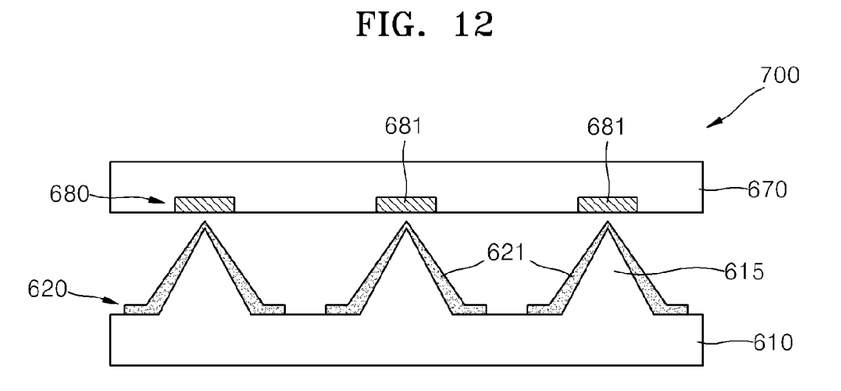
FIG. 12 is a schematic sectional view of a pressure sensor according to another exemplary embodiment.

FIG. 12 is a schematic sectional view of a pressure sensor 700 according to another exemplary embodiment.

The pressure sensor 700 according to the current exemplary embodiment is different from the pressure sensor 600 of FIG. 11 in terms of the shape of a counter electrode 680.

The counter electrode 680 includes a plurality of sub counter electrodes 681 corresponding to a plurality of sub piezoresistive electrodes 621. The plurality of sub counter electrodes 681 may be arranged on an insulating substrate 670 according to the arrangement of the plurality of sub piezoresistive electrodes 621.

The structure of the counter electrodes 680 enables the pressure sensor 700 to sense either the degree and location of pressure that is locally applied or a distribution of pressure, similar to the counter electrode CE of FIG. 11. Also, since the plurality of sub counter electrodes 681 are prepared in a form corresponding to the shapes of the plurality of sub piezoresistive electrodes 621, a distribution of pressure may be more precisely sensed.

FIGS. 13A to 13D illustrate a method of manufacturing a pressure sensor according to an exemplary embodiment.

Figure 13A:
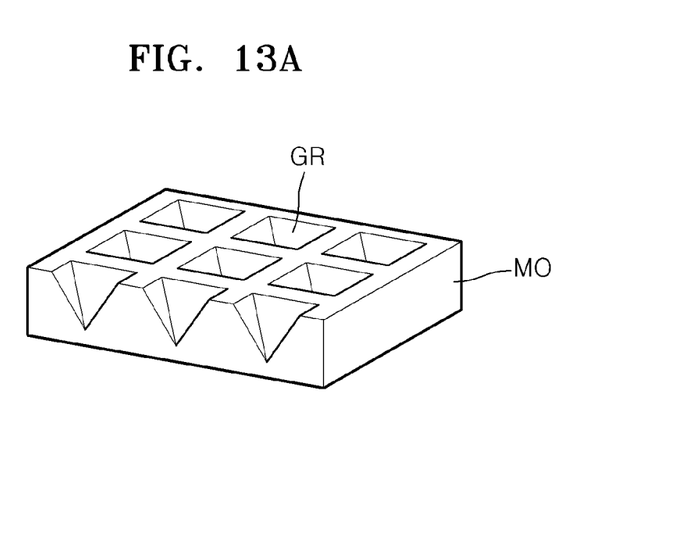
FIGS. 13A to 13D illustrate a method of manufacturing a pressure sensor according to an exemplary embodiment.

First, as illustrated in FIG. 13A, a mold MO having grooves GR having shapes corresponding to a plurality of deformable structures to be formed is formed. The mold MO may be formed of, for example, silicon which is shaped by using photolithography, etching, etc.

Figure 13B:
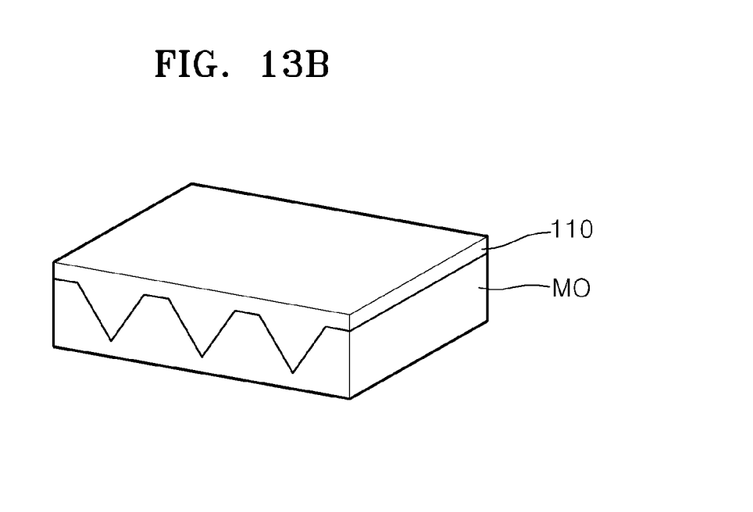
Figure 13C:
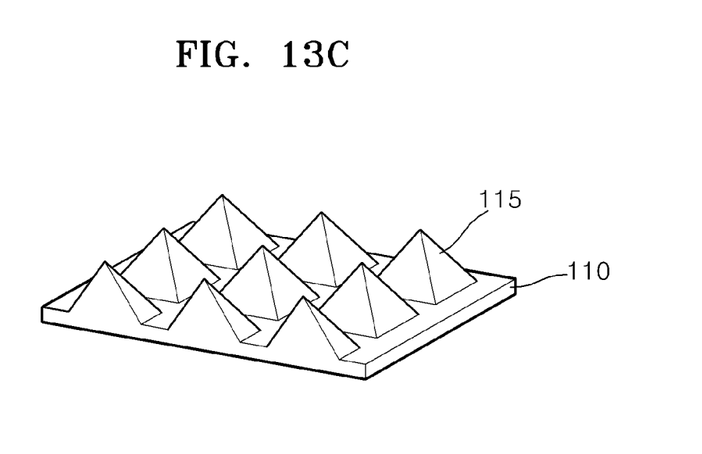

Then, as illustrated in FIGS. 13B and 13C, an elastic thin film 110 having the plurality of deformable structures 115 thereon is formed by copying the shape of the mold MO. The copying may be performed by an imprinting method in which a process of applying heat or pressure to the elastic thin film 110 and hardening the resultant structure may be performed.

Figure 13D:
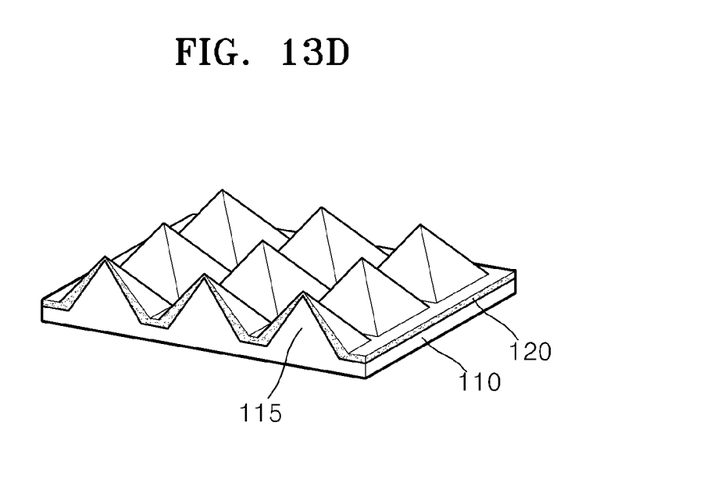

Then, a piezoresistive electrode 120 is formed by coating a conductive material along surfaces of all the deformable structures 115.

After the piezoresistive electrode 120 is formed, the piezoresistive electrode 120 may be patterned to divide the piezoresistive electrode 120 into a plurality of sub piezoresistive electrodes, if needed.

Then, a counter electrode corresponding to the piezoresistive electrode 120 may be prepared and disposed to face the piezoresistive electrode 120.

The pressure sensor manufactured as described above has flexible and stretchable properties and has a high sensitivity capable of sensing even low pressure.

Thus, the pressure sensor may be conformably attached to a human body and may be used to precisely perform biological monitoring, e.g., pulse monitoring. Also, the pressure sensor may be attached to a robotic hand so as to control a fine sense of touch.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While a pressure sensor and a method of sensing pressure by using the pressure sensor according to the exemplary embodiments have been described with reference to the exemplary embodiments illustrated in the drawings, it will be understood by those of ordinary skill in the art that various changes in form and details may be made therein without departing from the spirit and scope of the exemplary embodiments as defined by the following claims.

What is claimed is:

1. A pressure sensor comprising:
an elastic thin film comprising a first surface and a second surface that face each other, the elastic thin film comprising an elastomer material, and the first surface being patterned to have a plurality of protruding deformable structures;
a piezoresistive electrode formed along surfaces of the plurality of protruding deformable structures, the piezoresistive electrode being shaped to protrude in accordance with a shape of the plurality of protruding deformable structures; and
a counter electrode disposed to face the piezoresistive electrode,
wherein the piezoresistive electrode protrudes toward the counter electrode, and
wherein as pressure applied to the counter electrode becomes stronger, a contact area between the piezoresistive electrode and the counter electrode becomes larger.

2. The pressure sensor of claim 1, wherein the elastic thin film comprises at least one of thermoplastic rubber, silicone rubber, fluoro silicone rubber, vinyl methyl silicone rubber, styrene-butadiene rubber, styrene-ethylene-butylene-strylene rubber, acryl rubber, butadiene rubber, chloro isobutylene isoprene rubber, polychloroprene rubber, epichlorohydrin rubber, ethylene propylene rubber, ethylene propylene diene rubber, polyether urethane rubber, polyisoprene rubber, isobutylene isoprene butyl rubber, acrylonitrile butadiene rubber, polyurethane rubber, and polydimethylsiloxane (PDMS).

3. The pressure sensor of claim 1, wherein the piezoresistive electrode comprises a mixture of a flexible or elastic polymer material and a conductive material.

4. The pressure sensor of claim 3, wherein the conductive material comprises at least one of conductive polymer, metal nanowire, metal nanoparticles, carbon nanotubes, and graphene.

5. The pressure sensor of claim 3, wherein the polymer material comprises at least one of polyester, polyvinyl alcohol, polyvinyl acetate, thermoplastic rubber, and silicone rubber.

6. The pressure sensor of claim 1, wherein cross-sectional areas of the plurality of protruding deformable structures are tapered as the plurality of protruding deformable structures extend towards the counter electrode.

7. The pressure sensor of claim 1, wherein the piezoresistive electrode is thinnest at uppermost portions of the plurality of protruding deformable structures, the uppermost portions being portions which are nearest to the counter electrode, and becomes thicker from the uppermost portions to bottom portions of the plurality of protruding deformable structures.

8. The pressure sensor of claim 1, wherein the piezoresistive electrode is conformably formed along shapes of the plurality of protruding deformable structures.

9. The pressure sensor of claim 1, wherein the plurality of protruding deformable structures comprise at least one of a cylindrical shape, a polygonal pillar shape, a cone shape, a polypyramid shape, a truncated cone shape, and a truncated polypyramid shape.

10. The pressure sensor of claim 1, wherein the counter electrode comprises a metal.

11. The pressure sensor of claim 1, wherein the counter electrode comprises an elastic conductive material.

12. The pressure sensor of claim 1, further comprising a plurality of other protruding deformable structures patterned on the second surface of the elastic thin film.

13. The pressure sensor of claim 12, further comprising:
another piezoresistive electrode formed on surfaces of the plurality of other protruding deformable structures; and
another counter electrode disposed to face the other piezoresistive electrode.

14. The pressure sensor of claim 1, wherein the piezoresistive electrode is continuously formed along the surfaces of the plurality of protruding deformable structures.

15. The pressure sensor of claim 1, wherein the piezoresistive electrode comprises a plurality of sub piezoresistive electrodes discontinuously formed along the surfaces of the plurality of protruding deformable structures, the sub piezoresistive electrodes being spaced apart from one another.

16. The pressure sensor of claim 15, wherein the counter electrode comprises a plurality of sub counter electrodes corresponding to the plurality of sub piezoresistive electrodes.

17. The pressure sensor of claim 15, wherein the counter electrode comprises a flat plate type electrode disposed to face the plurality of sub piezoresistive electrodes.

18. The pressure sensor of claim 1, wherein the counter electrode and the piezoresistive electrode are spaced apart from each other.

19. The pressure sensor of claim 18, wherein, when the pressure is applied to the counter electrode, the counter electrode contacts the piezoresistive electrode to thereby deform the piezoresistive electrode.

20. The pressure sensor of claim 1, wherein an equivalent resistance of the pressure sensor comprises:
a resistance of the counter electrode;
a resistance of the piezoresistive electrode; and
resistance at an interface between the counter electrode and the piezoresistive electrode,
wherein the resistance of the counter electrode is lower than the resistance of the piezoresistive electrode, and the resistance of the counter electrode is also lower than the resistance at the interface between the counter electrode and the piezoresistive electrode.

* * * * *